Figure 1:
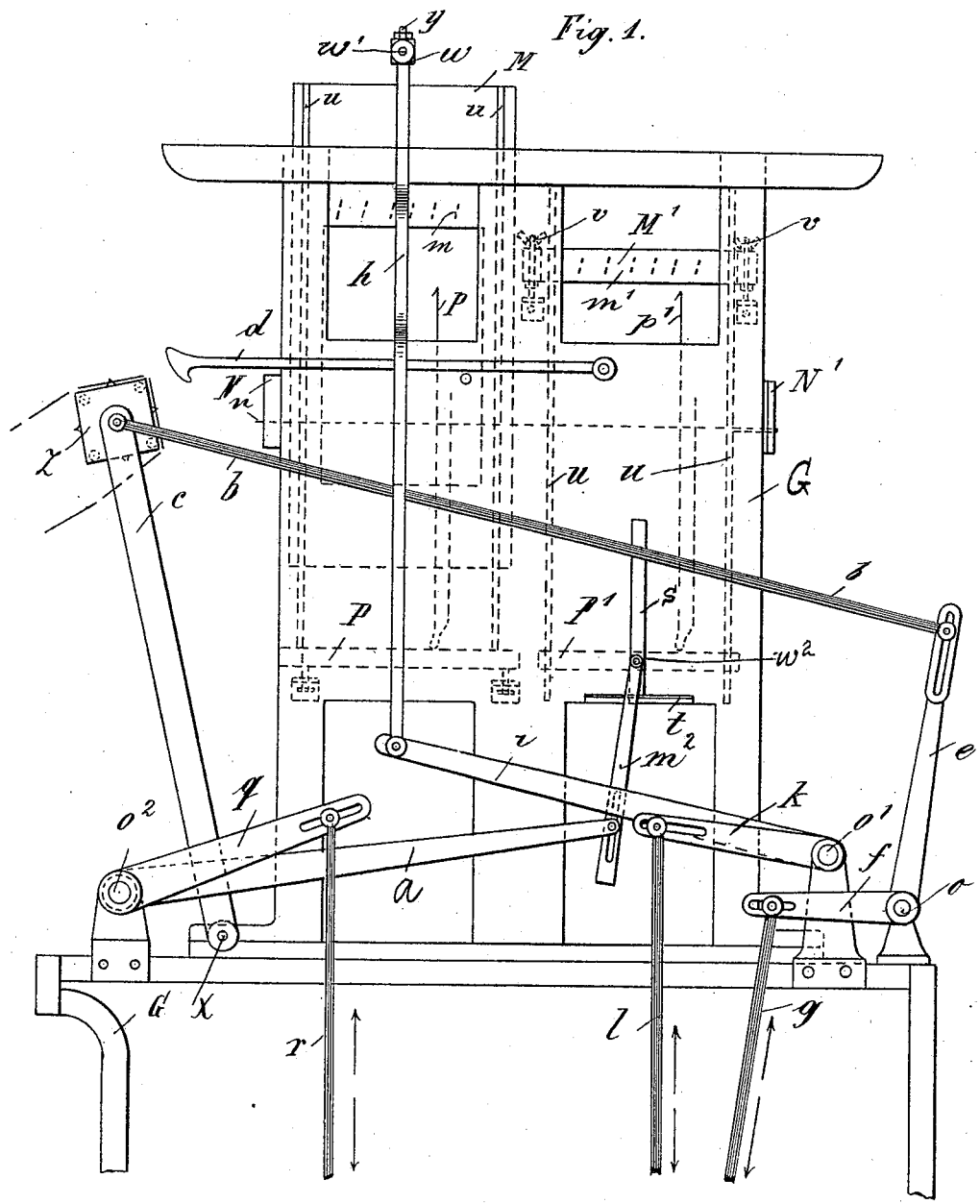

No. 616,769. Patented Dec. 27, 1898.
E. CLAVIEZ.
DOUBLE ACTING JACQUARD MACHINE FOR WEAVING DOUBLE PLUSH FABRICS.
(Application filed Jan. 28, 1896.)
(No Model.) 8 Sheets—Sheet 1.

Witnesses
H. van Oldenneel
E. A. Scott

Inventor
Emil Claviez
by Richards R
Attorneys.

No. 616,769. Patented Dec. 27, 1898.
E. CLAVIEZ.
DOUBLE ACTING JACQUARD MACHINE FOR WEAVING DOUBLE PLUSH FABRICS.
(Application filed Jan. 28, 1896.)
(No Model.) 8 Sheets—Sheet 2.

No. 616,769. Patented Dec. 27, 1898.
E. CLAVIEZ.
DOUBLE ACTING JACQUARD MACHINE FOR WEAVING DOUBLE PLUSH FABRICS.
(Application filed Jan. 28, 1896.)
(No Model.) 8 Sheets—Sheet 3.

No. 616,769.　　　　　　　　　　　　　　Patented Dec. 27, 1898.
E. CLAVIEZ.
DOUBLE ACTING JACQUARD MACHINE FOR WEAVING DOUBLE PLUSH FABRICS.
(Application filed Jan. 28, 1896.)

(No Model.)　　　　　　　　　　　　　　8 Sheets—Sheet 4.

Witnesses
H. van Oldenneel
E. A. Scott

Inventor
Emil Claviez
by Richards
Attorney

No. 616,769. Patented Dec. 27, 1898.
E. CLAVIEZ.
DOUBLE ACTING JACQUARD MACHINE FOR WEAVING DOUBLE PLUSH FABRICS.
(Application filed Jan. 28, 1896.)
(No Model.) 8 Sheets—Sheet 5.

No. 616,769.  
E. CLAVIEZ.  
Patented Dec. 27, 1898.  
DOUBLE ACTING JACQUARD MACHINE FOR WEAVING DOUBLE PLUSH FABRICS.  
(Application filed Jan. 28, 1896.)  
(No Model.)  
8 Sheets—Sheet 6.

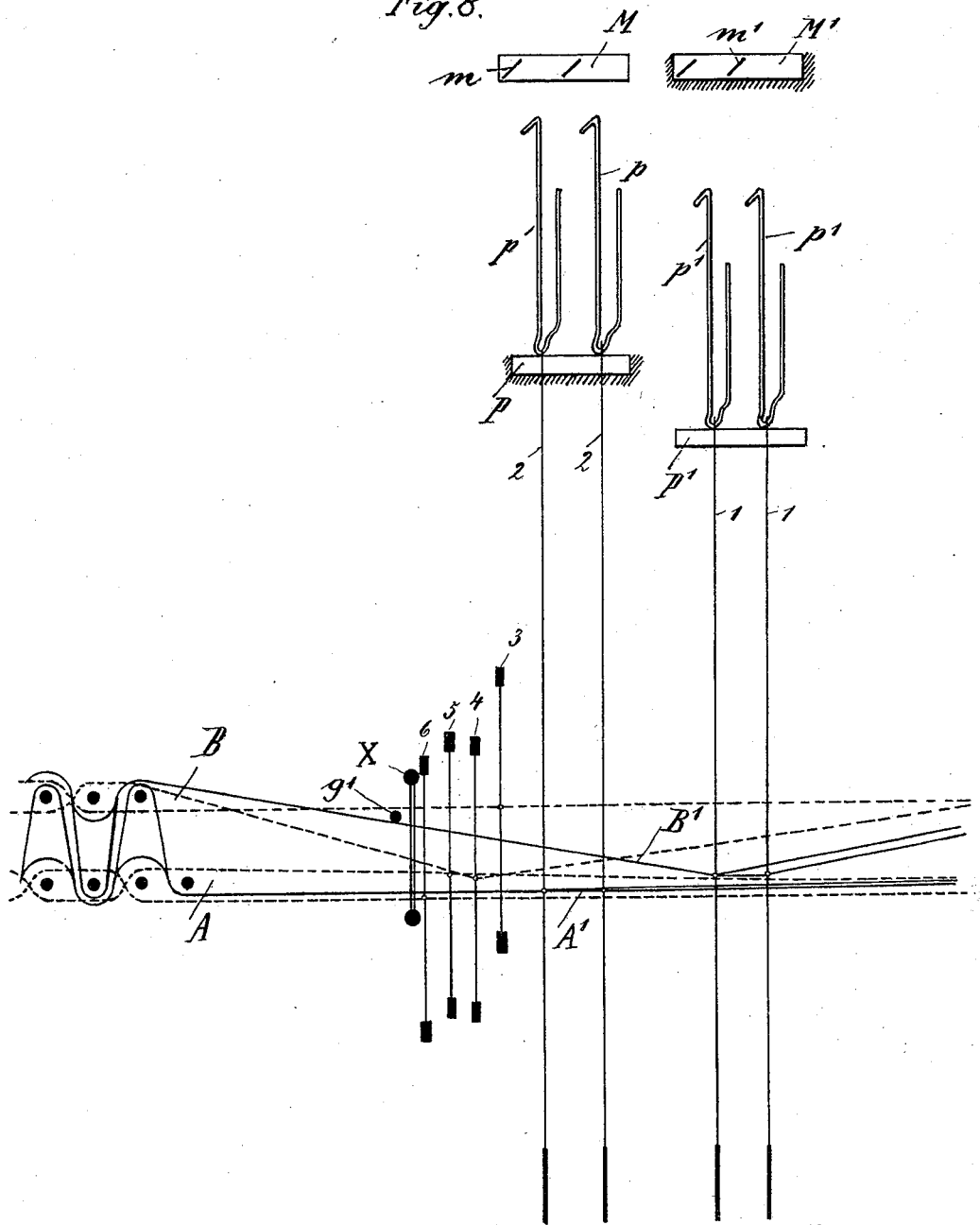

No. 616,769. Patented Dec. 27, 1898.
E. CLAVIEZ.
DOUBLE ACTING JACQUARD MACHINE FOR WEAVING DOUBLE PLUSH FABRICS.
(Application filed Jan. 28, 1896.)
(No Model.) 8 Sheets—Sheet 8.
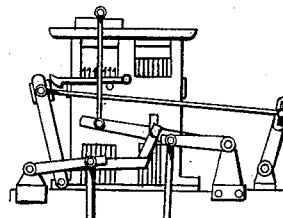
Fig. 10.
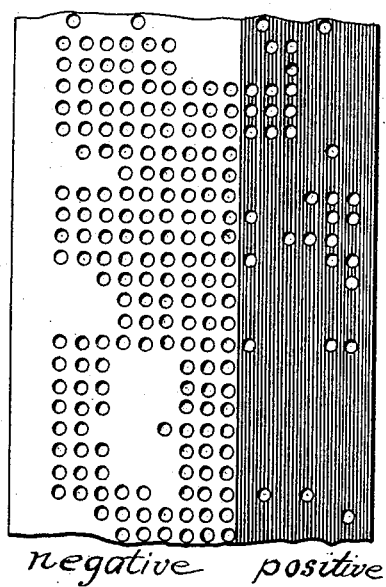
negative   positive
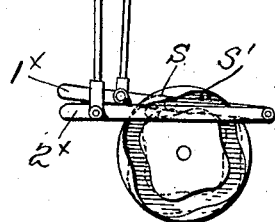
Fig. 9.
Attest
Walter Donaldson
H. L. Mockbee
Inventor
Emil Claviez
by Richards & Co
Attys.

UNITED STATES PATENT OFFICE.

EMIL CLAVIEZ, OF CHEMNITZ, GERMANY, ASSIGNOR TO KUNSTWEBEREI, CLAVIEZ & CO., GESELLSCHAFT MIT BESCHRÄNKTER HAFTUNG, OF LEIPSIC, GERMANY.

DOUBLE-ACTING JACQUARD-MACHINE FOR WEAVING DOUBLE-PLUSH FABRICS.

SPECIFICATION forming part of Letters Patent No. 616,769, dated December 27, 1898.

Application filed January 28, 1896. Serial No. 577,199. (No model.)

*To all whom it may concern:*

Be it known that I, EMIL CLAVIEZ, director, of 8 Ziegelstrasse, Chemnitz, in the Empire of Germany, have invented a new and useful Improvement in Double-Acting Jacquard-Machines for Weaving Double-Plush Fabrics, of which the following is a specification.

The invention has been patented in Germany, No. 91,005, dated December 13, 1893; in Austria-Hungary, No. 28,552 and No. 45,291, dated December 30, 1893; in France, No. 234,935, dated December 12, 1893; in England, No. 3,142, dated February 12, 1894; in Italy, No. 36,101, dated March 31, 1894; in Belgium, No. 108,933, dated March 9, 1894; in Canada, No. 54,979, dated March 5, 1894; in Switzerland, No. 11,737, dated January 1, 1896; in Sweden, No. 8,013, dated April 11, 1896; in Norway, No. 5,181, dated March 28, 1896; in Spain, No. 13,701, dated February 24, 1896; in Luxemburg, No. 2,602, dated September 2, 1896, and in British India, No. 109, dated May 22, 1896.

The present invention has for its object a "jacquard-machine" with a positive and negative action and which is intended, chiefly, for the production of double-plush fabrics. This machine is characterized especially in that it combines in a certain degree two jacquard-machines acting positively and negatively, of different construction, and which are so arranged that the adjustable knife-box is in the negative machine, while the adjustable plate or wire tray (German "platinenboden") is in the positive machine.

The new machine is shown in the accompanying drawings.

Figure 2:
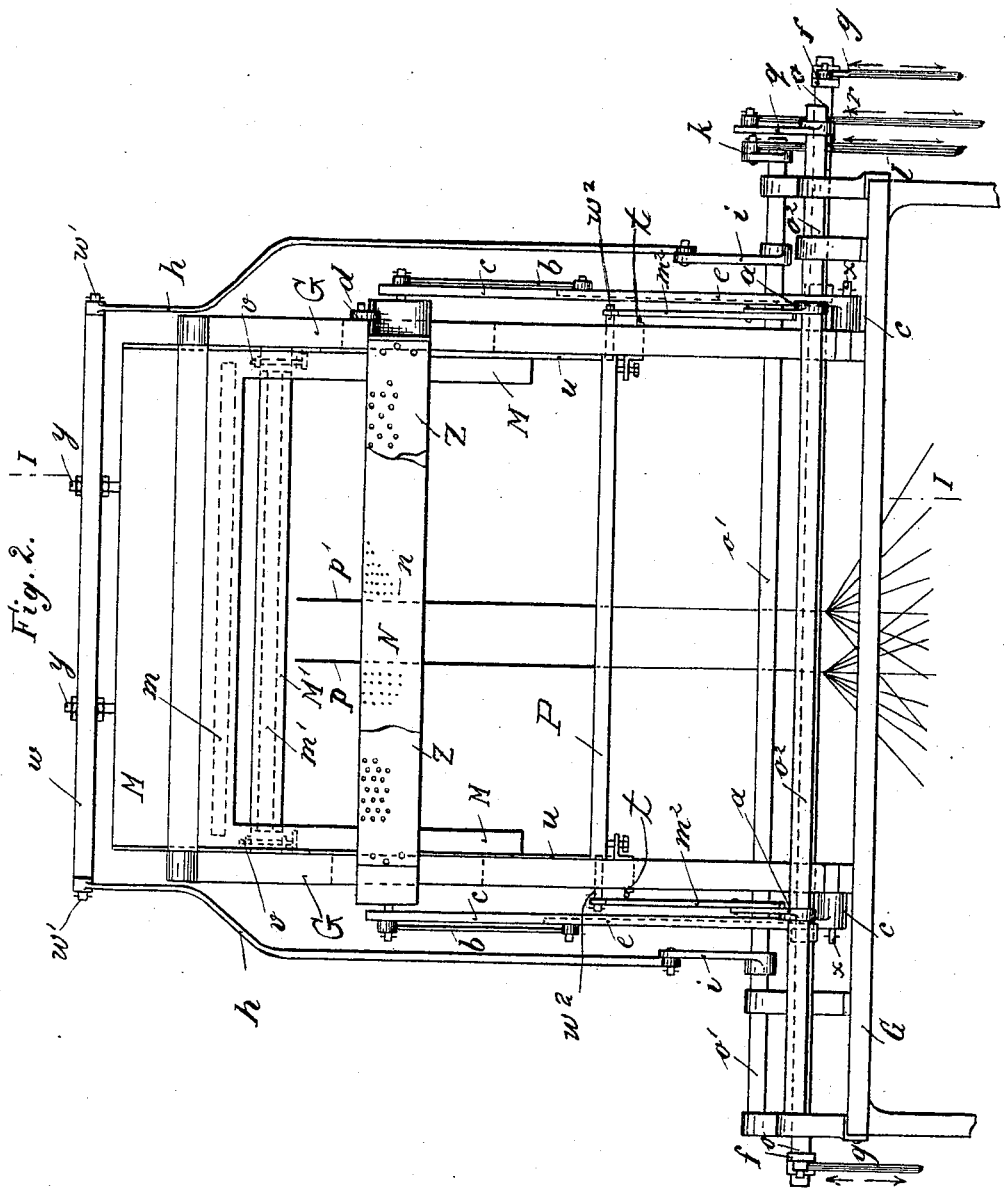
Figure 3:
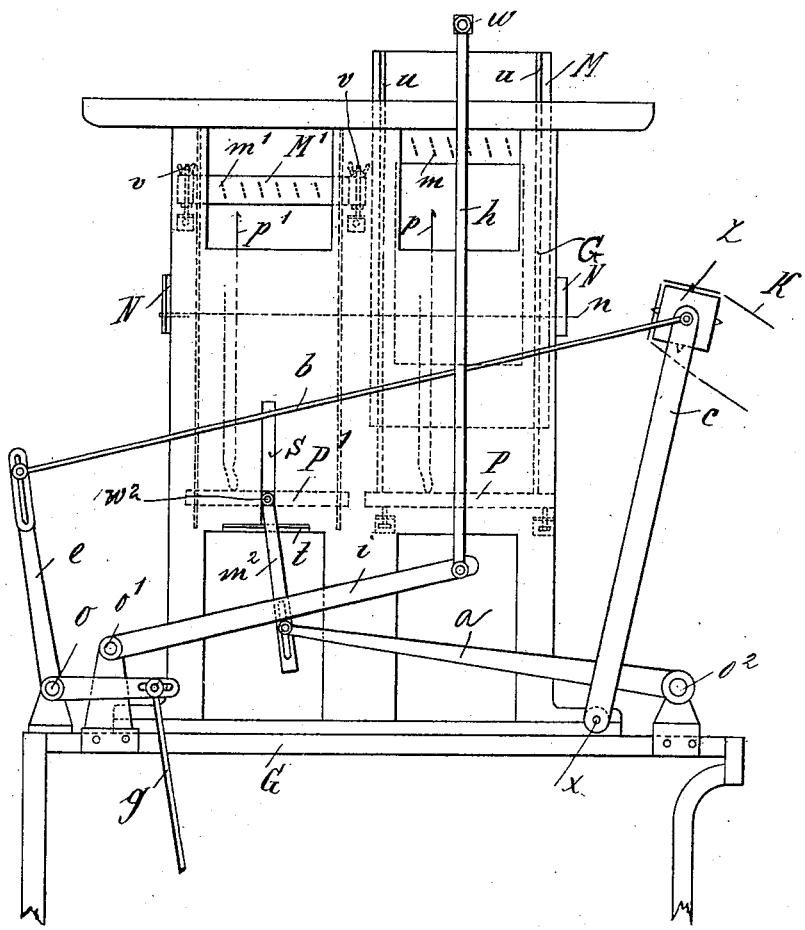
Figure 4:
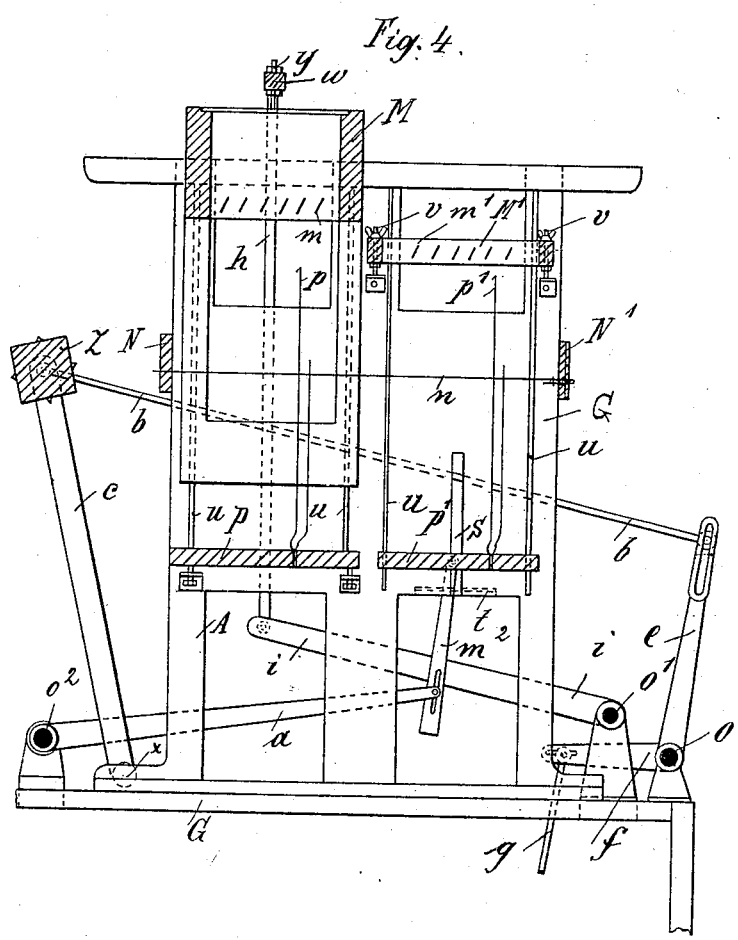
Figure 5:
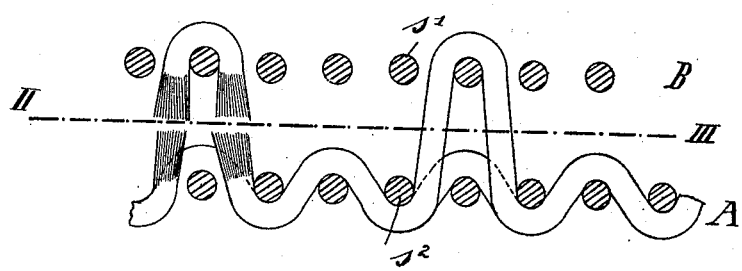
Figure 6:
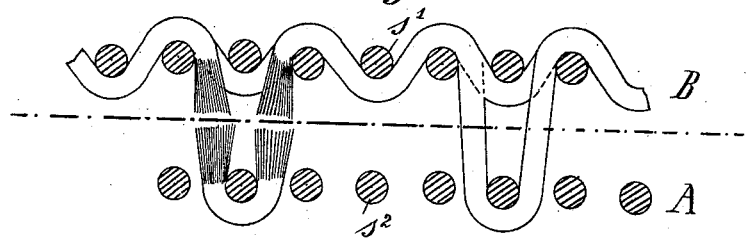
Figure 7:
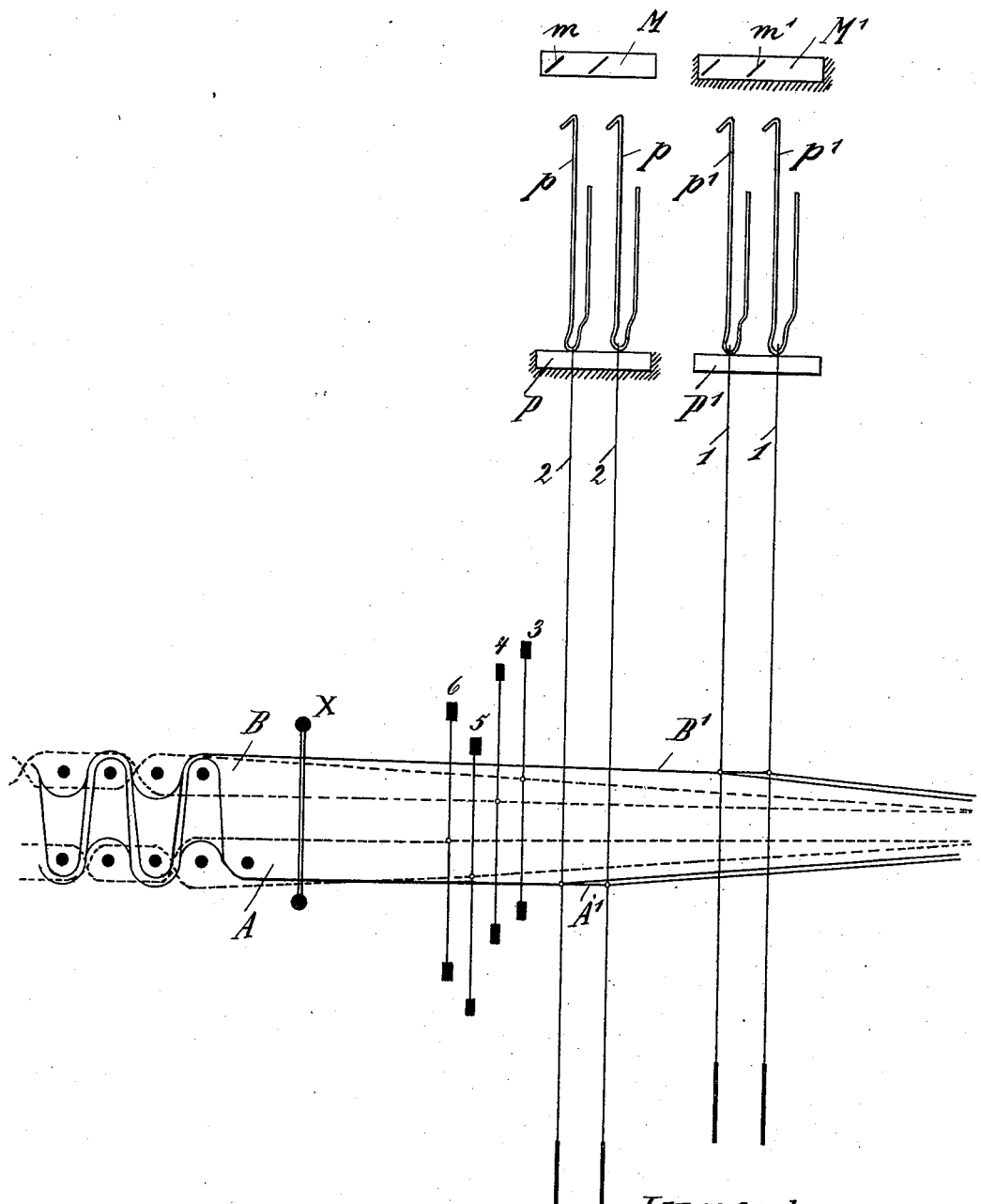

Figure 1 is a right-hand view of the jacquard-machine. Fig. 2 is a front side view; Fig. 3, a view from the left side; Fig. 4, a section on I I of Fig. 2. Fig. 5 shows the double pile produced by my invention and showing the fabric with the nap-threads of the lower fabric fastened into the upper fabric. Fig. 6 shows the fastening of the nap-threads of the upper fabric into the lower fabric. Figs. 7 and 8 are diagrams showing the operation of the loom. Fig. 9 illustrates how the movable wire tray and griff are operated. Fig. 10 shows a pattern-card with the positive and negative portions.

The jacquard-machine is arranged on the upper part of the loom-frame in a suitably-constructed framework G, and the parts to which reference is here had are worked from the shafts $o$ $o'$ $o^2$, which latter are themselves set in motion by the eccentric-rods $g\, l\, r$, the eccentrics of which are fastened on the picker-shaft of the loom. The front plate or wire tray P is firmly, but adjustably, situated between the two walls of the framework G, Figs. 1 and 2. The knife-box M, with its knives $m$, has at its head adjustment-screws $y$ and which hold fast the cross-rail $w$. The latter carries on each side round bolts $w'$, Fig. 2, each of which receives a draw-bar $h$, Figs. 1 and 2. Further, the lower parts of the draw-bars $h$ are each connected with a lever $i$, situated on a shaft $o'$. The requisite up-and-down movement of the knife-box is effected by means of the lever $k$, also on the shaft O', and eccentric-rod $l$ and a cam-groove S in the face of a cam, Fig. 9, which engages a roller on the lever $l^\times$, to which the rod $l$ is connected, so that by each up-and down movement the knife-box rises and sinks so as to work the front positive group of plates. For the steady guidance of the knife-box M it carries on both front sides two rails $u\, u$, Figs. 1 and 4, which are suitably guided in grooves of the framework G.

The negatively-working part of the jacquard-machine has, as already mentioned, a firmly-seated but adjustable knife-box and a movable plate or wire tray. The construction of this part of the machine is as follows: The plate or wire tray P' moves in a similar manner to the previously-mentioned knife-box M in guides $u\, u$, Figs. 1 and 2, and for carrying out its object is provided with bolts $w^2$, projecting out of the walls G, and these bolts serve for the reception of links $m^2$, which latter are in turn connected with levers $a$, seated on a shaft $o^2$. The up-and-down movement of the plate or wire tray P' is caused by lever $q$, also fixed on shaft $O^2$ and eccentric-rod $r$. This rod is operated from a lever $2^\times$, which has a roller engaging a cam-groove S' in the face of a cam-disk. The cam-grooves S S' are displaced in relation to each other. The bolts $w^2$ project out of the walls of the frame through slots s, Fig. 1. In order to limit the downward stroke of the plate or wire tray, a rail t is fastened to the walls of the frame on each side. The second knife-box M' is arranged in a fixed manner; but the same can be adjusted at wish as regards height by means of four winged nuts v. This is of special value when plushwork of different pile is to be produced, since by adjusting the knife-box of the negative machine and the plate or wire tray of the positive one it will be understood that a varying height in the pile chain or loops is attained, resulting in a greater or lesser separation of the two ground-pieces, and consequently a higher or lower pile. As regards the movement of the pattern-cylinder Z it may be mentioned that the same is journaled on two levers c and swings on two bolts $x\ x$. The motion is effected by means of the rods b b, connected with the levers c c on each side, Figs. 1, 3, and 4, each in connection with a slotted lever e, seated on the shaft o, which latter in turn receives its swinging motion from levers f and eccentric-rods g. The arrangement of the card-changing hook d and needles n in the needle-board N and spring-box N' is similar to what is in the ordinary jacquard-machine, and it is supposed that these parts will be readily understood. The hook d acts to turn the card-cylinder.

In Fig. 3 the left side view of the above-mentioned parts is shown, and which, owing to their concealment in Fig. 1, will be better understood from this view. As regards the construction of the pattern-cards passing over the pattern-cylinder Z it may be mentioned that the one half is formed positively and the remainder negatively. By the first-mentioned half the front part of the machine comes into play and by the second, on the contrary, the rear half.

The work capacity of the foregoing machine is further considerably increased, since owing to the adjustability of the knife-box or plate or wire tray varying heights of pile can be obtained. By means of these two parts of the jacquard-machine and owing to the advantage above named all interference between the warp-threads of the two fabrics is prevented as one warp is drawn into the front part and the second into the rear part of the jacquard-machine.

From the foregoing description it is evident that one part of the jacquard-machine moves only when the other is stationary. The result of this is that the warp-threads of the goods (the upper and lower fabrics) cannot cross, whereby on the one hand the material is very little affected and on the other hand a clean shed is obtained, so that with this jacquard-machine a pure double plush of constant height of pile may be produced.

Fig. 7 of the accompanying drawings shows the position of the various shafts 3 4 5 6 and of the harness parts 1 and 2 at rest. It will be seen that the loom comprises two lifting-wire groups independent of each other and that they do not exercise any influence upon each other during the single movements.

In the diagram Figs. 7 and 8 the wire tray P as well as the knife-box M' are shown with hatched lines, to indicate that the wire tray P and the knife-box M' are fixedly arranged. The wires or hooks p are actuated by the knife-box M, adjusted for an up-and-down movement, and they are pressed onto the knives and pressed off from the knives by means of the needles in the manner employed in all jacquard-machines in accordance with the pattern-card. The wires p, Fig. 7, are, moreover, connected with harness-cords and carry the thread eyes or loops at the lower ends into which the one part of the nap-thread is threaded.

The wires or hooks p' rest on the adjustable wire tray, and they are hung onto the knives m' of the leash-box M' by means of the wire tray when it is lifted, as shown from the preceding description. Thereby one set of wires or the other is raised. The engagement of the lifting wires or hooks with the knives will be in accordance with the dictates of the pattern. The parts are in the position of rest in Fig. 7.

It will be seen that the thread eyes or loops of the harness group into which the nap-shed or warp B' is threaded stand considerably higher when at rest than the thread-loops into which the nap-shed A' is threaded. This difference in height corresponds with the temporary length of the nap—i. e., the height or thickness given the nap in the prevailing weaving process. In Fig. 7, B represents the upper fabric, while A represents the lower fabric.

X is the reed. Regarding the position of rest of the shafts they are set in the manner shown in Fig. 7. Shafts 3 and 4 form the cloth or ground-web for the plush formation in the upper fabric, while shafts 5 and 6 represent the ground-webs which hold the plush or nap thread in the lower fabric. The double fabric is cut on the dotted line, as shown in Figs. 5 and 6, and in this manner two webs originate simultaneously.

Returning to the action of the jacquard-machine special attention is called to the fact that the harness groups 1 and 2 do not coöperate, but that the one part is set to action only after the other group has reached its position of rest. As a matter of course several colors can be used, and in such case, as a matter of example, harness group 2 or harness group 1 may be subdivided into several groups—i. e., in just as many as there are colors to be employed. If, for instance, the plush-web to be produced is composed of four colors, arrangements can be made that the red and green colors are in the two groups 1, while blue and yellow are laid in on groups 2. Assuming that two colors are in use, one in the upper fabrics B and threaded into harness part 1 and the other in the lower fabrics A and threaded into the harness group 2 and, if, for instance, the color of the upper fabrics shall appear also in the nap of the lower fabrics, the latter must be lowered. Should, on the other hand, the color of the lower fabrics appear in the upper warp, this must be raised.

In Fig. 8 it is assumed that the one part of the wire group (group 1) falls by means of the wire tray P'. The harness group 2 remains at rest, and the position of the shafts 3 4 5 6 is also changed in the manner shown in the drawings. The slay X now moves forward and beats the weft into the web. After this is accomplished the harness group 1 moves upward once more, as shown in Fig. 7, and group 2 enters into action, inasmuch as the knife-box M descends and raises the corresponding wires. The consequence will be that the nap-threads of the lower fabric are lifted and the same action takes place as in group 1. The result is that by the mutual ascent and descent of the single harness parts 1 and 2 in coöperation with the corresponding shafts the nap-thread A' is in one instance raised and bound by an appropriate weft and in the other instance the nap-thread B' is lowered and is also bound in that position with the proper weft. In this manner a nap is obtained which is uniform throughout. The nap-threads do not cross each other, as is the case in former machines, but they are kept separated while in motion and they are worked separately.

The machine serves for the manufacture of two figured plush-webs lying one above the other and being finished simultaneously and in the same manner. The individual threads form patterns one way by extending from the lower web into the upper one, and vice versa. To meet these requirements the jacquard-machine is constructed in the manner that two systems of wire and thread motions are combined therein. The one system (called "positive") operates so that the plush-threads of the lower web can be drawn up for the purpose of catching into the upper goods, while the other system (called "negative") operates so that the plush-threads of the upper goods can be let down for the purpose of catching into the lower web. The first-named system does not materially vary in its function from former jacquard-machines, while the latter system works in the opposite sense—i. e., while in the positive system the wires and their threads are drawn up by the movable lifting-griff and are left in their resting position on the fixed collar-board after the formation of the shed or leash the wires at rest in the negative system hang on a fixed high standing griff and are let down by means of the movable descending collar-board and are returned to their upper resting position after the leash is formed. The cards vary but slightly from the ones hitherto employed in their external form; but from the two differently-acting systems in one and the same machine it results that a determined number of longitudinal rows of holes on the card (shown on the shaded portion of the card, Fig. 10) act upon the positive system, while the remaining rows of holes of the card (at the left of the figure) act upon the negative system of the machine. The kind of pattern to be made determines which plush-forming wire groups must be punched or perforated in the positive part of the pattern-card and which non-plush-forming wire groups must be punched in the negative part of the pattern-card. The holes of the positive part cause the actuating of the positive wires, while the holes of the negative part leave the negative wires at rest.

I claim—

A double-acting jacquard-machine for producing double-plush fabrics, comprising a series of needles, a card-cylinder controlling the same, the lifting-wires $p$, $p$, carrying the eyes for the pile-threads of the lower fabric, the lifting-wires $p'$, $p'$, carrying the eyes for the pile-threads of the upper fabric, a stationary wire tray P and a movable griff M for the said lifting-wires $p$, a movable wire tray P' and fixed griff M' for the lifting-wires $p'$, the said movable wire tray and griff moving independently and one moving only while the other is at rest whereby the pile-threads will be kept from crossing each other, and means for moving the said movable griff and tray independently, substantially as described.

In witness whereof I have hereunto set my hand in presence of two witnesses.

EMIL CLAVIEZ.

Witnesses:
  PAUL SCHULZ,
  RICHARD BLOBEL.